United States Patent [19]

Fujii et al.

[11] Patent Number: 5,101,863
[45] Date of Patent: Apr. 7, 1992

[54] REHABILITATING UNDERGROUND PIPES WITH EXPANDING HELICALLY WOUND LINER

[75] Inventors: Shigeki Fujii, Narashi; Hirozo Hirayama, Koka; Minoru Yasuhara, Isezakishi; Masahisa Sonku, Hikoheshi, all of Japan

[73] Assignee: Rib Loc Australia Pty. Ltd., Dry Creek, Australia

[21] Appl. No.: 603,771

[22] PCT Filed: May 1, 1989

[86] PCT No.: PCT/AU89/00184
§ 371 Date: Dec. 18, 1990
§ 102(e) Date: Dec. 18, 1990

[87] PCT Pub. No.: WO89/11060
PCT Pub. Date: Nov. 16, 1989

[30] Foreign Application Priority Data
May 2, 1988 [JP] Japan .................. 63-109566

[51] Int. Cl.$^5$ .................. F16L 55/18; B29C 63/34
[52] U.S. Cl. .................. 138/98; 138/97; 138/154; 264/269; 405/150; 405/150.1
[58] Field of Search .................. 138/97, 98, 154, 121, 138/122; 405/150, 154; 264/268, 269, 36

[56] References Cited

U.S. PATENT DOCUMENTS

| 4,647,072 | 3/1987 | Westman | 138/97 |
| 4,678,370 | 7/1987 | Allen | 138/97 |
| 4,867,203 | 9/1989 | de Putter | 138/98 |
| 4,897,911 | 2/1990 | Keldany et al. | 405/150 |

FOREIGN PATENT DOCUMENTS

| 434556 | 10/1969 | Australia . |
| 42585/85 | 5/1984 | Australia . |
| 51955/86 | 10/1985 | Australia . |
| 116130 | 5/1987 | Japan . |
| WO87/05677 | 3/1987 | PCT Int'l Appl. . |

Primary Examiner—James E. Bryant, III
Attorney, Agent, or Firm—Gordon L. Peterson

[57] ABSTRACT

A method of rehabilitating underground pipes which comprises the steps of: (a) forming a liner pipe (5) by winding a strip (4) made of a synthetic resin into a helical shape so that the side edges of the convolutions of the wound strip (4) are interengaged with each other; (b) continuously introducing the liner pipe (5) into an underground pipe (1) while the liner pipe (5) is being advanced inside the underground pipe (1); inserting a slip restraining member in the form of a wire rod (6) continuously to the interconnected edges of the convolutions of the said strip (4), and then removing the said strip (4) when the diameter of said liner pipe (5) is to be increased at the same rate as said strip (4) for forming said helical liner pipe (5) is conveyed.

2 Claims, 5 Drawing Sheets

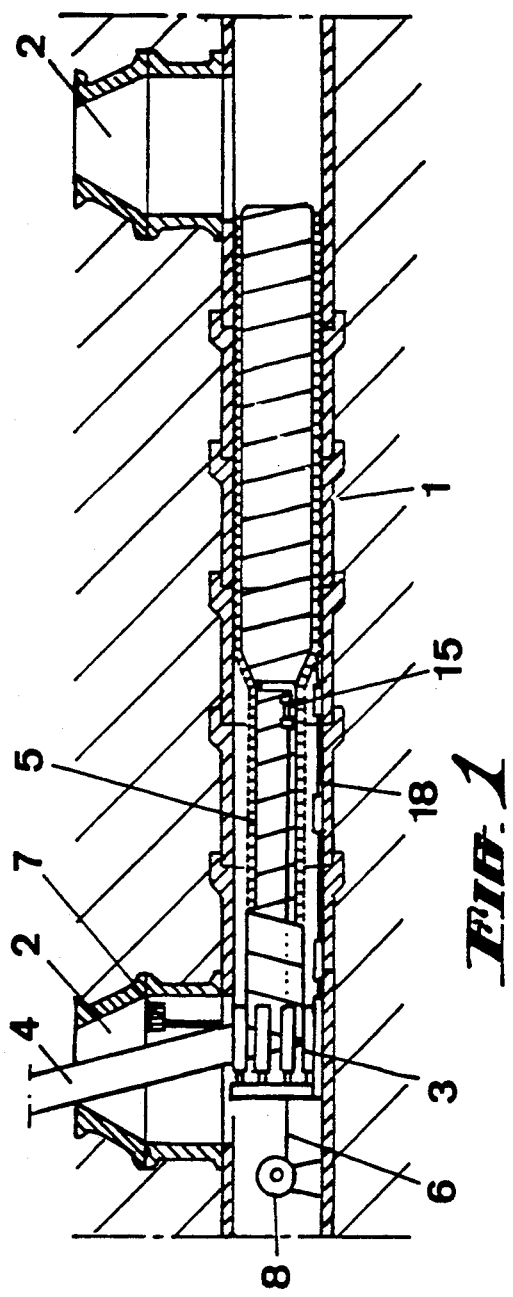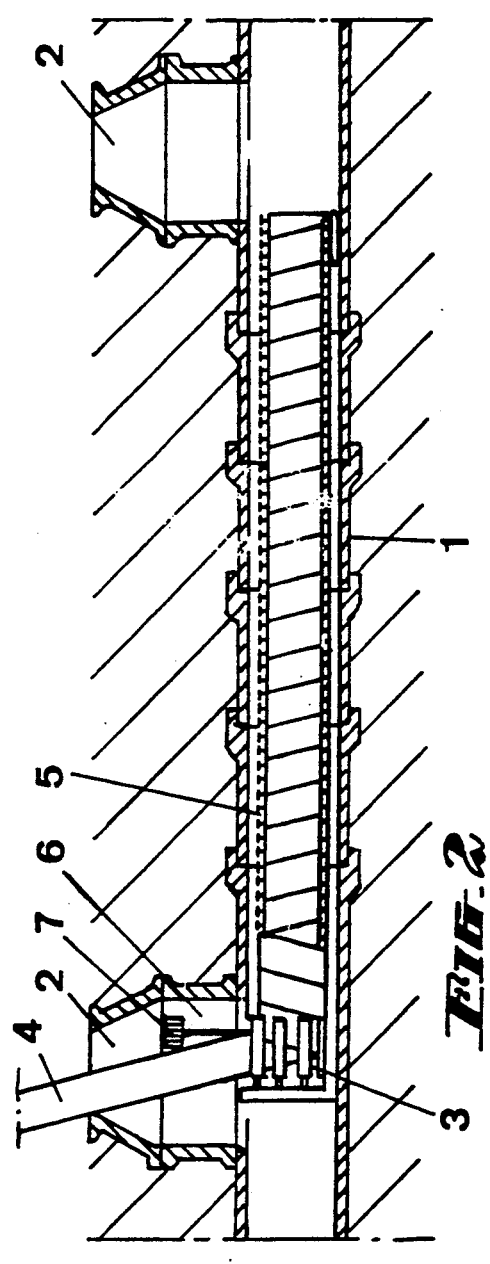

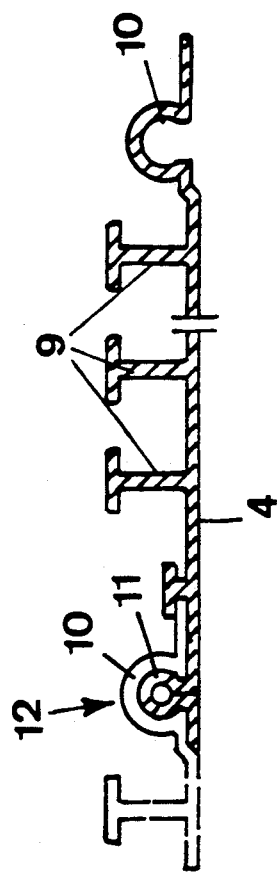
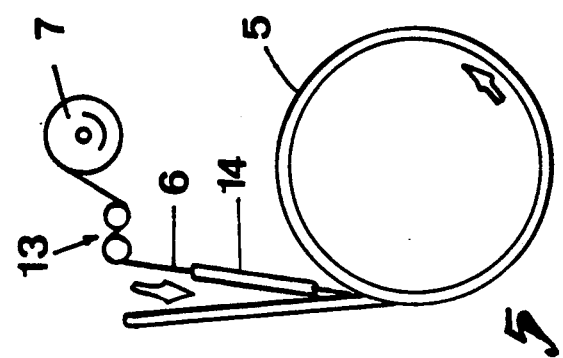
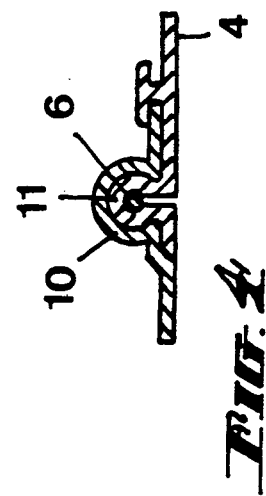
FIG. 3
FIG. 4
FIG. 5

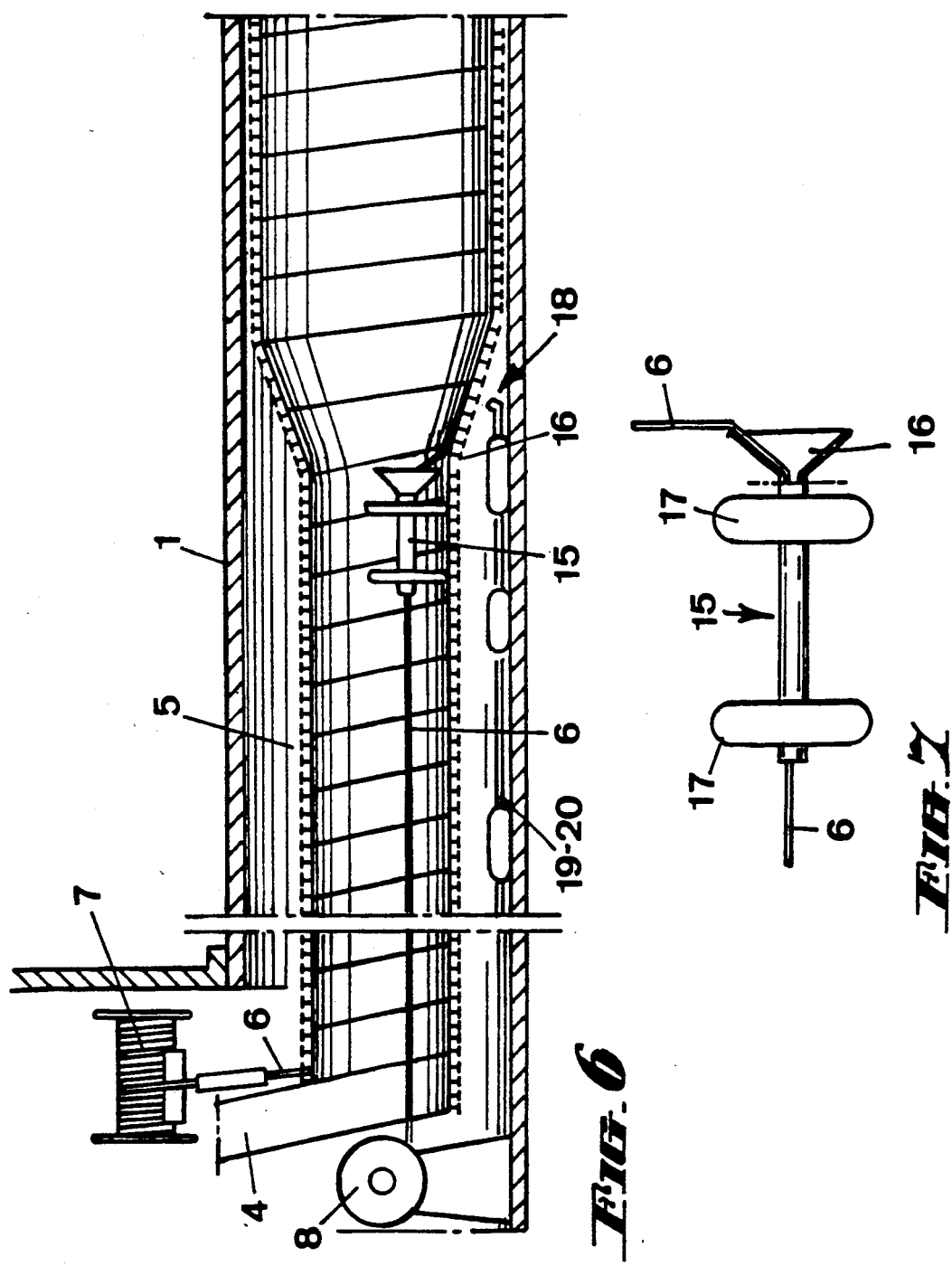

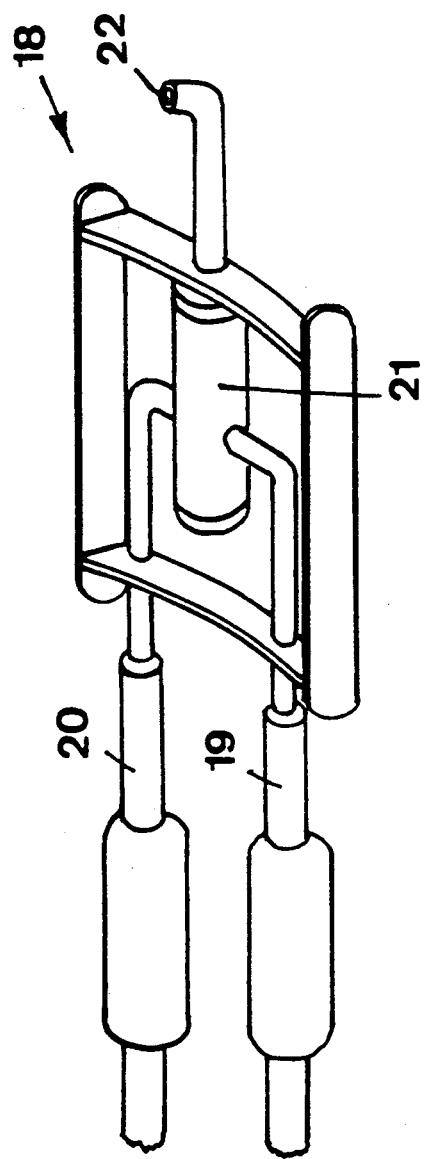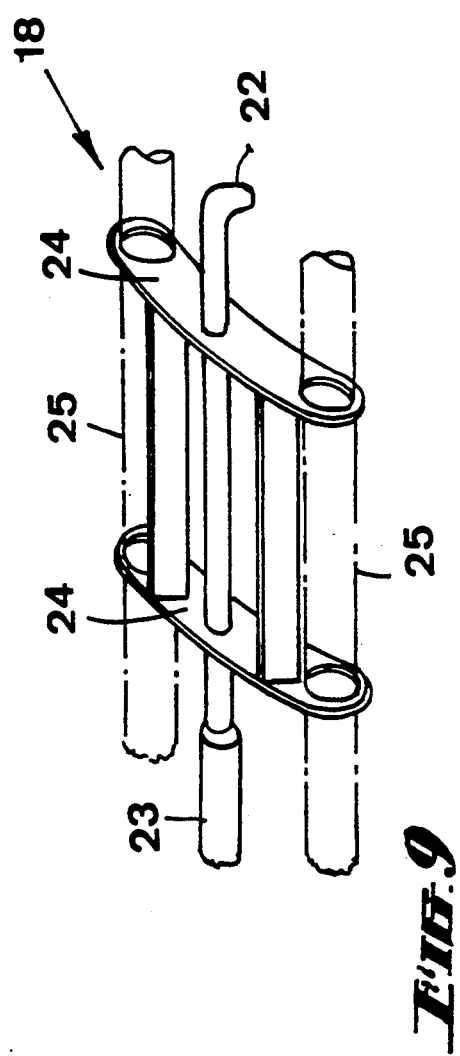

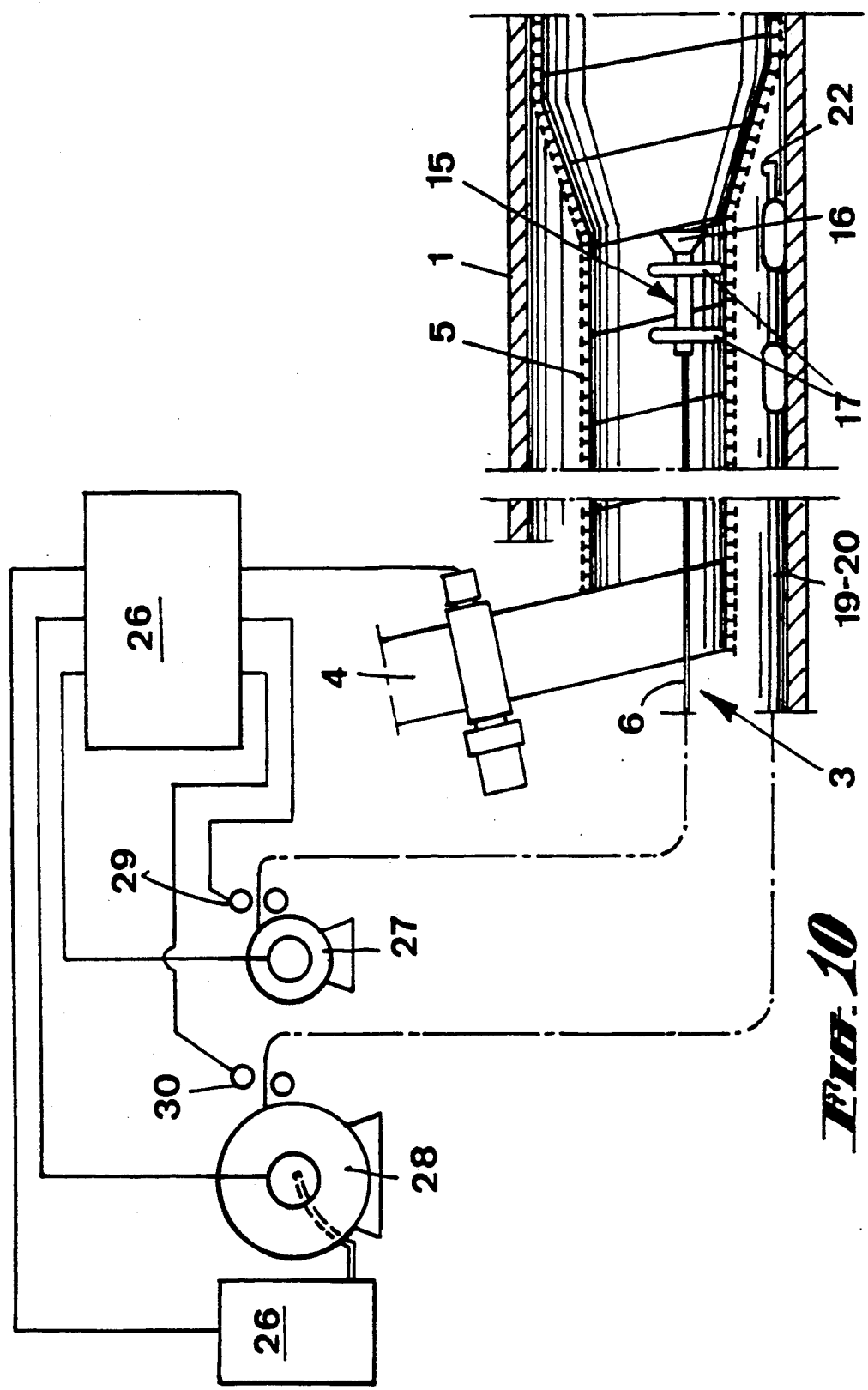

REHABILITATING UNDERGROUND PIPES WITH EXPANDING HELICALLY WOUND LINER

BACKGROUND OF THE INVENTION

1. Field of the Invention

This invention relates to a method of rehabilitating underground pipes with a lining comprising a helically wound liner pipe made of a synthetic resin, this comprises the steps of winding a strip of a synthetic resin into a helical shape around a virtual cylinder, so that the side edges of the wound strip are interengaged with each other, and continuously introducing the helically wound liner pipe hereafter referred to as a "liner pipe", into an underground pipe while the liner pipe is being advanced inside the underground pipe, and then fixing the leading end of the liner pipe to the underground pipe and further advancing the liner pipe being formed inside the underground pipe so that the wound strip is allowed to slide around the virtual cylinder with is side edges still interengaged with each other to result in a gradual progressive increase in the diameter of the liner piper toward the winding machine end.

2. Description of the Related Art

The method of forming such helical pipes has already been disclosed in Patent literature, see for instance European Patent Office Publication No. 0001894 in the name of Ri Loc Hong Kong Limited, or Patent Co-operation Treaty Publication No. WO85/03755 in the name of Rib Loc Hong Kong Limited which related to a modification of the system, and see particularly Patent Co-operation Treaty Publication No. WO89/01588 in the name of Rib Loc Australia Pty. Ltd. which related to restraining means for such a pipe structure to control the progressive expansion of the helically wound liner pipe in the underground pipe.

SUMMARY OF THE INVENTION

Thus according to the described method of rehabilitating underground pipes with a lining formed of a helically wound liner piper made of a synthetic resin, the liner pipe has a comparatively small diameter when being introduced into the underground pipe because the interconnected side edges of the convolutions of the wound strip are securely engaged with each other by use of a wire rod, so that it can smoothly advance inside the underground pipe without being disturbed by frictional resistance, which would be exerted by the inner surface of the underground pipe on the helical liner pipe.

After the liner piper is introduced into the underground pipe and the leading end of the helical liner pipe is fixed to the underground pipe, the restraining member is removed from the strip, bringing about the slackening of the engagement between the interengaged side edges of the wound strip, so that the wound strip slides around a virtual cylinder, resulting in a increase in diameter of the liner pipe.

Consequently, the outer diameter of the liner piper is made substantially equal to the inner diameter of the underground pipe; and the cross-sectional area of the underground pipe with the lining formed by the liner pipe is substantially equal to that of the underground pipe without the lining, so that the amount of a fluid which flows through the pipe with the lining per unit minute is substantially equal to or even greater than that which flows through the pipe without the lining per unit minute, depending on the type of the underground pipe to be rehabilitated.

Because the sliding of the wound strip around a virtual cylinder is physically prevented by the restraining member, the formation of the liner pipe can be performed without difficulty even when the liner pipe gets wet inside sewage pipes or during rainy weather.

The present invention relates generally to the described system but is specifically directed to further improvements, particularly a method which allows the space between the expanding pipe to be filled by injecting a backfilling material into the space between the outer surface of the liner piper and the inner surface of the underground pipe, the method consisting of moving a unit for supplying the backfilling material in the direction of the axis of the liner pipe as the portion of the said liner pipe with the increasing diameter is moved in the same direction.

The backfilling material is applied onto the outer surface of the liner pipe directly after the diameter of the liner pipe is increased, so that the efficiency in performing the work is substantially increased. When a foaming material is used for backfilling, the space between the inner surface of the underground pipe and the outer surface of the liner piper can be filled without fail. Moreover, the rate at which the restraining member is removed from the strip, the rate at which the unit for supplying the backfilling material is moved, and the rate at which the backfilling material is supplied are controlled, based on the rate at which the strip is conveyed, efficiency in performing the work is much increased and the number of persons needed to carry out the work can be reduced to a great extent.

The method of forming the restraining means between the edges of the convolutions of the strip and the application thereof also forms part of this invention as well as the particular backfilling material.

Other features of the present invention will be apparent from the following description which is made with reference to the accompanying drawings which are of an illustrative nature only and not necessarily to be taken as limiting the invention.

DESCRIPTION OF THE PREFERRED EMBODIMENT

FIG. 1 is a longitudinal section of an underground pipe showing a section of liner pipe according to this invention inserted in the underground pipe between manholes with part of the liner pipe being shown expanded.

FIG. 2 is a similar view to FIG. 1 but showing the liner pipe before expansion has taken place to show the smaller diameter which allows insertion during the formation and forward projection of the liner pipe by the winding machine.

FIG. 3 is a typical form of the strip and joining means used according to this invention, the illustration showing a cross section of the strip involved and showing how the two edges of adjacent convolutions are joined together.

FIG. 4 is a transverse section of the two edges joined together and locked against longitudinal movement, the one in relation to the other, by a wire rod which expands the inner part of the join into a locking configuration and forces the locking member to restrict sliding action between the inter engaged edges of the convolutions of the strip.

FIG. 5 is a view, to reduced scale, of the end of a helically wound liner pipe showing how the locking wire rod is fed into the joining member of the strip as the liner pipe is being formed.

FIG. 6 is a longitudinal section showing how during the formation and expansion of the liner pipe the wire rod is fed into position and withdrawn at the point where expansion proceeds in a progressive manner.

FIG. 7 is a fragmentary side elevation of guide means for the wire rod which ensure that the wire rod is pulled cleanly out of the groove in which it is housed, the guide member moving around within he helically wound liner pipe which is being expanded according to the position at which the wire rod is being removed.

FIG. 8 is a perspective view showing the injection device used where back filling material, in this case a foaming material, is injected to the area where expansion of the helically wound pipe is taking place.

FIG. 9 is a similar view to FIG. 8 but showing the form of the injecting device when injection of a material other than a foaming material is required, and FIG. 10 is a schematic view showing the system in use, the underground pipe and the helically wound liner pipe being shown in longitudinal section to show particularly the wire rod and the back fill injection system.

The underground pipe 1 has manholes 2 at intervals and in one of these is positioned a winding machine 3 by means of which a strip 4 is formed into a helically wound liner pipe 5 which is advanced into the underground pipe 1 as it is being formed. When the advancing end of the helically wound liner pipe 5 reaches the next manhole 2, the liner pipe 5 is expanded by rotating the end of the liner pipe until it engages the underground pipe 1 and is fixed thereto, after which further production of the liner pipe 5 by the winding machine 3 causes progressive expansion of the liner pipe 5 as shown more particularly in FIG. 1, the expansion being controlled by unlocking the join formed between convolutions of the strip by withdrawing the wire rod 6 which is forced into the join between convolutions of the strip to lock the join against sliding motion of one edge over the other, the wire rod 6 being fed from a spool 7 and after withdrawal from the liner pipe 5 at the point of required expansion is taken up on a second spool 8.

The locking action is described particularly with reference to FIGS. 3 4 and 5 where the strip 4 is shown as having a number of upstanding ribs 9 and at one end, a socket 10 adapted to engage a hollow bead 11 which is shaped to fit into the socket 10 with a sliding fit when not locked by the wire rod 6, such a sliding joint being shown at 12 in FIG. 3.

In FIG. 4 the wire rod 6 is shown in position, the dimensions of this being such that the bead 11 is expanded tightly into the socket 10 so that when the wire is in position during initial winding no expansion of the liner pipe 5 can take place, expansion being only allowed after the required length of liner pipe 5 has been inserted into the underground pipe 1 and its distant end expanded and fixed.

FIG. 6 illustrates how the wire rod 6 is fed from the first spool 7 over guides 13 into the hollow of the bead 11, a guide 14 being used which may be adapted to deform the wire rod 6 to enhance slip prevention between the socket 10 and the bead 11 of the strip 4.

In FIG. 6 is shown particularly how the wire rod 6 passes from the first spool through the guide 14 to be wound into the hollow in the bead 11 and is drawn from the formed liner pipe 5 through a reel 15 which may be free to move within the liner pipe 5 but has a belled end 16 to allow the wire rod 6 to pass through it and be guided towards the area at the liner pipe where it is to be withdrawn, this reel having cheeks 17 which allow it to accommodate itself and follow the path of the wire rod 6 as it is withdrawn. FIG. 6 showing only diagrammatically the static position of the reel which can roll around in the liner pipe 5 according to where the wire rod 6 is being withdrawn from the hollow of the bead as the expanding proceeds.

In FIG. 5 is shown ejection means 18 used when a two component back fill material is used, the injection means 18 having two supply pipes 19 and 20 connected together in a mixing chamber 21 which feeds the mixed foaming backfill material through the nozzle 22.

In FIG. 9 the injection means 18 have only a single supply pipe 23 feeding the injection nozzle 22, and the injection means in this case include brackets 24 which support the nozzle 22 and which can engage tracks or guide rods which can hold the nozzle 22 above the area into which the backfilling material is to be discharged.

Referring to FIG. 10, this shows control means 26 for synchronizing the various actions which occur during the helical winding of the strip 4 into the liner pipe 5, the expansion of the liner pipe 5 by progressively withdrawing the wire rod 6 from the hollow head 11 and the supply of the backfilling material and controlling the point of backfill through the nozzle 22 by moving the nozzle 22 synchronously with the withdrawal of the wire rod 6 to ensure that the backfill is applied at the location where the liner pip 5 is about to contact the underground pipe 1.

As said the back filling material is preferably a foaming material which sets after the line pipe 5 is in its fully expanded position but other form of backfill material can be used such as a cementitious material or grouting which can be applied from the nozzle 22 into the area where the material is required or can be forced into the spaced between the ribs on the strip 4.

The control means 26 are connected to secure and control the winding machine 3 as well as actuating the means 27 which withdraw the wire rod 6 and the means 28 which withdraw the nozzle 22 synchronously with the withdrawal of the wire rod 6, the driving means which effect the actual withdrawal of the wire rod being shown schematically by the rollers 29, while the driving means which move the nozzle 22 are shown schematically by the roller 30. The means 27 and 28 can be hydraulic motors or similar speed controllable units.

We claim:

1. A method of rehabilitating underground pipes (1) using a lining consisting of a helically formed liner pipe (5) made of a synthetic resin, which comprises the steps of: (a) forming a liner piper (5) by winding a strip (4) made of a synthetic resin into a helical shape around a virtual cylinder, so that the side edges of the convolutions of the wound strip (4) are interengaged with each other; inserting a slip restraining member in the form of a wire rod (6) continuously to the interconnected edges of the convolutions of the said strip (4), and then removing the said strip (4) when the diameter of said liner pipe (5) is to be increased at the same rate as said strip 94) for forming said helical liner pipe (5) is conveyed; (b) continuously introducing said liner pipe (5) into an underground pipe (1) while said liner pipe (5) is being advanced inside the underground pipe (1); (c) fixing the leading end of said liner pipe (5) to the underground pipe when a required length has been advanced; (d) further advancing said liner pipe (5) inside the underground pipe (1) with its leading end fixed to the underground pie (1), so that the wound strip (4) is allowed to slide around the virtual cylinder with its side edges still being interengaged with each other, resulting in the gradual increase in the diameter of said helical liner pipe; and (e) injecting a backfilling material into the space between the outer surface of said liner pipe (5) and the inner surface of the said underground pipe (1) by moving a nozzle (22) for supplying the backfilling material in the direction of the axis of said liner pie (5) synchronously as said rod is withdrawn and the increasing diameter is shifted in the same direction.

2. The method of rehabilitating underground pipes (1) with a liner pipe (5) formed from a strip (4) of synthetic seam according to claim 1 wherein the backfilling material is a foaming material.

* * * * *